(No Model.)
J. DAVIS.
PULVERIZER AND CULTIVATOR.
No. 392,190. Patented Nov. 6, 1888.
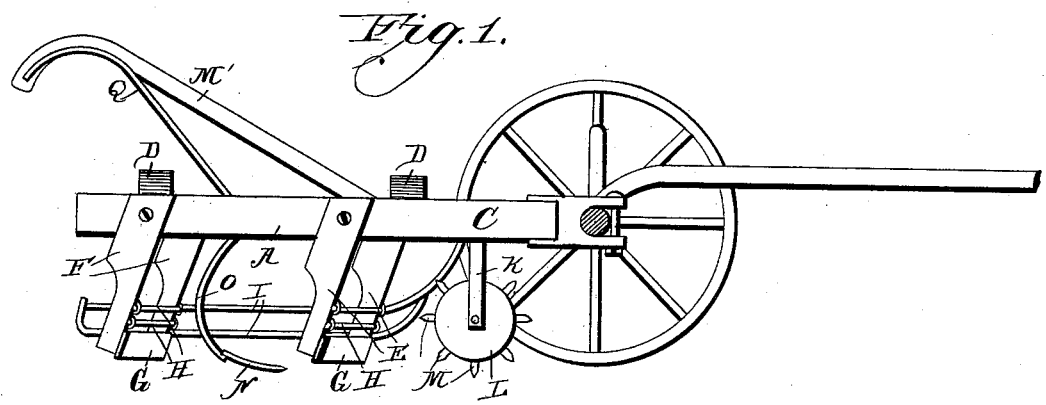
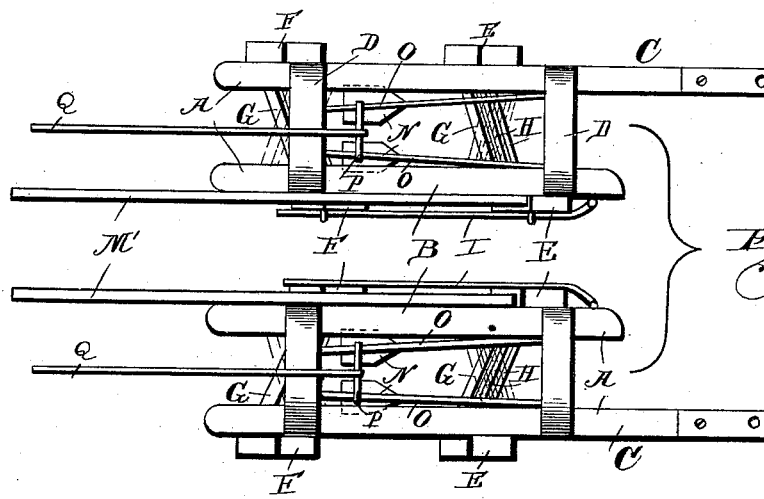
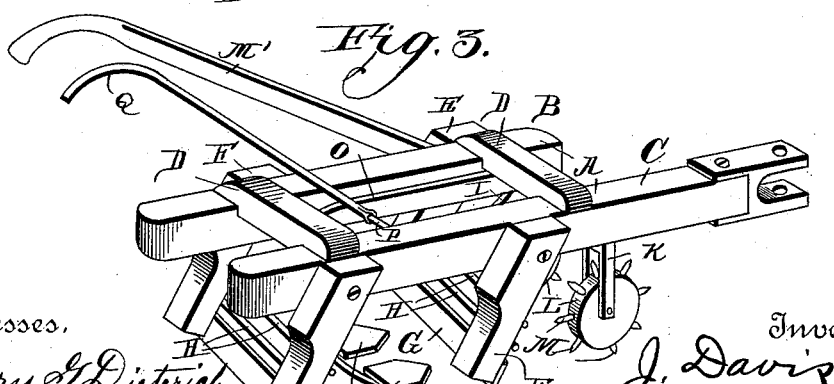

UNITED STATES PATENT OFFICE.

JEHU DAVIS, OF BRINGHURST, INDIANA.

PULVERIZER AND CULTIVATOR.

SPECIFICATION forming part of Letters Patent No. 392,190, dated November 6, 1888.

Application filed July 25, 1888. Serial No. 281,003. (No model.)

*To all whom it may concern:*

Be it known that I, JEHU DAVIS, a citizen of the United States, residing at Bringhurst, in the county of Carroll and State of Indiana, have invented a new and useful Improvement in Pulverizers and Cultivators, of which the following is a specification.

My invention relates to an improvement in pulverizers and cultivators; and it consists in the peculiar construction and combination of devices, that will be more fully set forth hereinafter, and particularly pointed out in the claims.

In the accompanying drawings, Figure 1 is a side elevation of a cultivator and pulverizer embodying my improvements, showing the same attached to a sulky-frame. Fig. 2 is a top plan view of my pulverizer and cultivator, showing the same detached from the sulky-frame. Fig. 3 is a detail perspective view of one of my pulverizers and cultivators.

A represents a pair of frames, each of which comprises a pair of parallel beams, B C, the latter of which are longer than the former. A pair of cross-bars, D, connect the beams B C at suitable distance from the ends thereof. On the outer sides of the beams B C are bolted rearwardly-inclined standards E F, which are arranged diagonally opposite each other, as shown in Fig. 2. The lower ends of the said pairs of standards are connected by scrapers G, and the said pairs of standards are also connected by a series of transverse rods, H.

I represents fender-rods, which are arranged horizontally on the inner sides of those standards E F which are on the inner side of the shorter beams, B, and said fender-rods have their ends curved upward and secured to the said beams B, as shown.

From the front ends of the beams B C depend brackets or standards K, in which are journaled rollers L, which are provided with radial projecting knives or cutters M, and said rollers are adapted to rotate by contact with the earth when the machine is in motion and cause their knives or cutters to penetrate and stir the soil.

Each cultivator-frame is provided with a handle, M', which is similar to a plow-handle, and said cultivator-frames are arranged side by side at a suitable distance apart, with their shorter beams, B, opposite each other, as shown in Fig. 2, and the front ends of their longer beams, C, are pivotally connected to the cranked axles of the sulky-frame, as shown in Fig. 1. If preferred, however, the sulky-frame may be dispensed with and the front ends of the cultivator-frame connected together by an equalizing-bar, (not shown,) to which the horses may be attached.

N N designate two cutters or flat teeth, which are secured to the rear ends of two supporting-bars, O O, having their front ends pivoted to the beams B C and their rear ends connected by a cross-bar, P. A lever, Q, is secured to the cross-bar P and extends upward therefrom, so that the said teeth or cutter may be raised and lowered at will to pass stones or other obstructions and to facilitate the turning of the cultivator at the end of the line. The teeth are arranged to enter the soil to a slight depth and run just below the surface of the ground.

The operation of my invention is as follows: When the machine is in motion, the same is guided in a line parallel with the row of corn or other plants, with the cultivator-frame on opposite sides of the row. The rollers and their knives or cutters serve to stir and pulverize the soil, as before stated, and the cutters and scrapers, which operate in the soil at a slight depth, serve to thoroughly uproot the grass and weeds and sweep the same outward from the row of corn, and as the said weeds lodge against the cross-rods above the scrapers the earth adhering to their roots becomes thoroughly dislodged therefrom, and the weeds are finally left on the surface of the ground, with their roots exposed to the sun, and are hence effectually killed. The fenders serve to prevent clods and trash from falling on the rows of corn.

When the standards E F are arranged in the position shown in Fig. 2, the scrapers attached thereto are arranged obliquely to the line of draft, with their outer ends somewhat in rear of their inner ends, and are hence caused to sweep the clods, weeds, and trash outward from the row of plants, as before stated; but if it be desired to cause the earth to be swept inward toward the row of plants the same may be accomplished by reversing the position of the said standards on the cultivating-frame, as illustrated in dotted lines in Fig. 2.

Having thus described my invention, I claim—

1. The cultivator-frames arranged side by side and having the depending rearwardly-inclined standards E F, the scrapers connecting the lower ends of said standards in pairs, and the cross-bars connecting said standards above the scrapers, substantially as described.

2. The cultivator-frames having the rollers at their front ends provided with radial knives or cutters adapted to operate in the earth, the standards E F, depending from the cultivator-frames, and the scrapers connecting the lower ends of said standards in pairs, substantially as described, the cultivating-frames arranged side by side, and the longitudinal fender-bars connecting the standards on the inner or opposing sides of the cultivating-frame, substantially as described.

In testimony that I claim the foregoing as my own I have hereto affixed my signature in presence of two witnesses.

JEHU DAVIS.

Witnesses:
R. R. TIDRICK,
GEO. W. TIDRICK.